Sept. 3, 1929.  H. C. SCHAU  1,726,719
CHERRY PITTING MACHINE
Filed Aug. 26, 1927
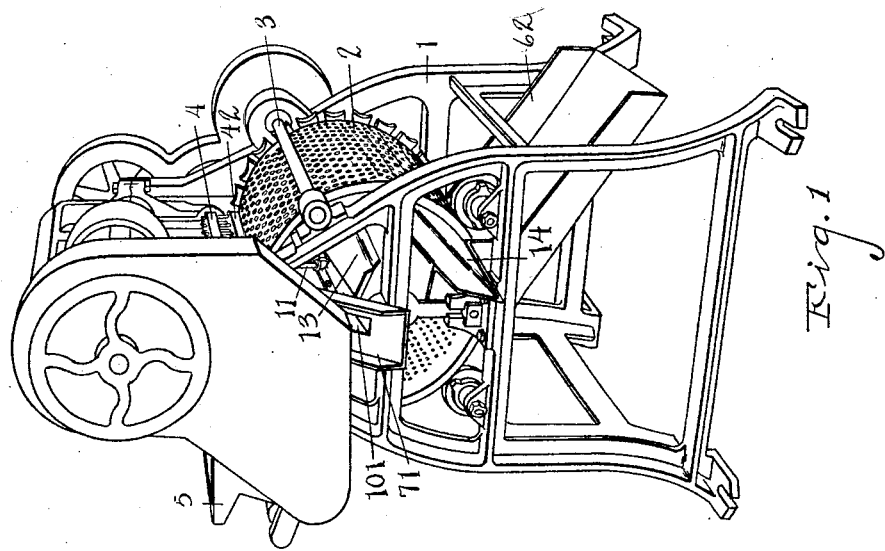
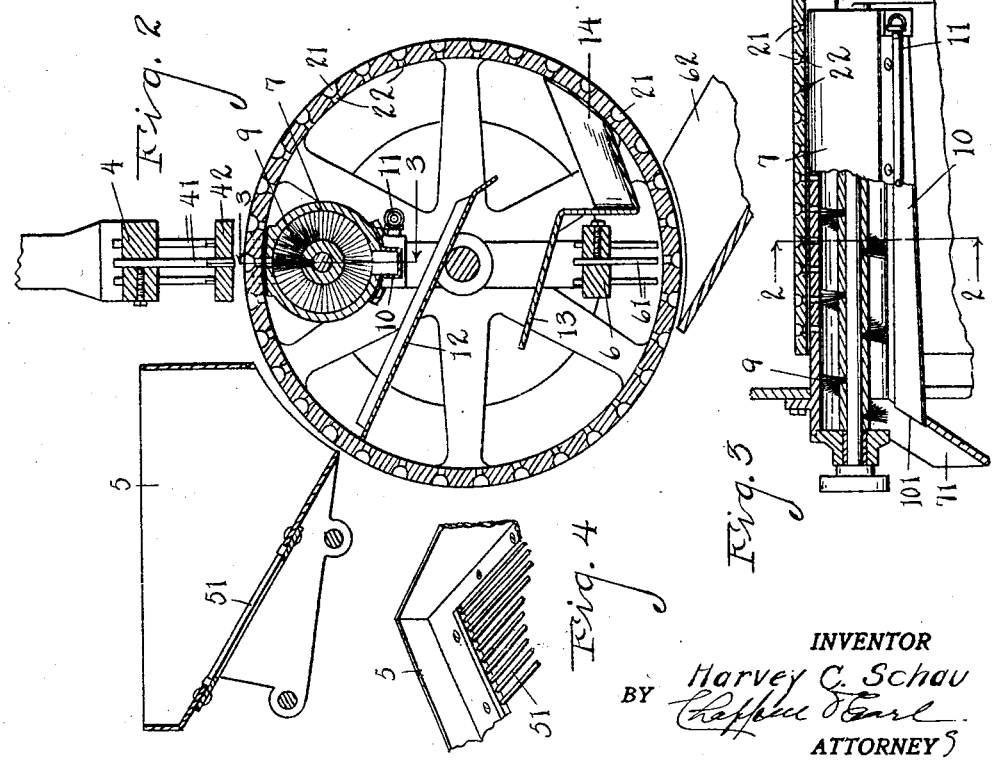
INVENTOR
Harvey C. Schau
BY
ATTORNEYS Patented Sept. 3, 1929.

1,726,719

UNITED STATES PATENT OFFICE.

HARVEY C. SCHAU, OF KALAMAZOO, MICHIGAN, ASSIGNOR TO DUNKLEY COMPANY, OF KALAMAZOO, MICHIGAN.

CHERRY-PITTING MACHINE.

Application filed August 26, 1927. Serial No. 215,631.

This invention is particularly an improvement upon the structure of United States Letters Patent No. 1,256,885, issued February 19, 1918, to Melville E. Dunkley.

The objects of the invention are,

First, to provide improved means of preventing the discharge of pits into the pitted cherries.

Second, to provide improved means of removing the pits from the cherries and discharging the same from the machine.

Third, to provide improved brush structure means for the purpose of removing the pits.

Objects pertaining to details of construction and operation will appear from the detailed description to follow. The invention is defined in the claims. A structure which is a preferred embodiment of the invention is illustrated in the accompanying drawing in which:

Fig. 1 is a perspective view of a cherry pitting machine embodying the features of my invention.

Fig. 2 is an enlarged detail transverse central sectional view through the entire pitting mechanism, taken on line 2—2 of Fig. 3.

Fig. 3 is an enlarged detail longitudinal sectional view through the pitter plunger section with the pit receiving chamber and brush in position, taken on line 3—3 of Fig. 2.

Fig. 4 is a detail perspective view of a part of the fruit chute and screen, for cleaning out and discharging the pits and like débris from the cherries as they pass to the machine.

The parts of the drawings will be identified by numerals of reference which are the same in all the views.

1 is the entire framework of the machine of usual form. 2 is the cherry supporting drum with rows of depressions 21. 3 is the driving means generally. 4 is the pitting plunger crosshead carrying the pitting plungers 41. 42 is the guide plate for the pitting plungers. 5 is the feed chute. 51 is a screen in the feed chute made up of parallel bars disposed longitudinally of the chute and so spaced that the stray pits drop through while the cherries are being fed to the machine to be pitted. 6 is the discharge crosshead carrying the discharge plunger pins 61 adapted to strike outwardly through the depressions 21 through the apertures 22 when brought into line on the under side, discharging the cherries into the discharge chute 62. The parts with the exception of the screen 51 so far described are in the form shown in the patent above referred to and I refer to that patent for detailed description if desired.

The cylindrical pit receiving chamber 7 is provided with spiral fiber cherry pit brush 9. The bottom of the chamber 7 is provided with a longitudinal slot and an inclined trough 10 beneath the slot (see particularly Figs. 2 and 3), delivering at 101 to the general discharge 71 from the chamber 7. A water pipe 11 is connected at the inner end of the trough 10 and delivers a small amount of water into said trough to assist in carrying the pits away while the machine is in operation.

Within the drum 2 is disposed a guide chute 12 to receive any small débris or pits that may come through the chute 5 and enter the interior of the drum through the perforations 22. This extends over to the side of the drum. A collector chute 13 is beneath the guide 12 and delivers into a discharge trough 14 which discharges out at the end of the machine, as seen in Fig. 1. These troughs and collectors for the pits are my addition and improvement to the machine and with the brush and coacting structures constitute my development of the combination.

The trough in connection with the chamber 7 is very important in its function because it enhances and increases the efficiency of the brush 9. The brush 9 is run at a high rate of speed and strikes pits from the plunger points so that they discharge at the slot and drop into the trough 10. Owing to the vacant space at the slot and the high speed of the brush, all débris is discharged from the brush by centrifugal action into the trough where it is carried away by the flow of a small amount of water, as indicated.

The improved brush feature in connection with the trough is adaptable to almost any variety of cherry pitting machines, and are features I claim specifically. I wish to claim the brush and trough feature not only specifically but broadly, as indicated in the appended claims.

Having thus described my invention, what I claim as new and desire to secure by Letters Patent is:

1. In a cherry pitting machine of the class described, a feed chute for the cherries containing a screen composed of parallel bars spaced to permit the discharge of pits and to advance the cherries into the machine, a guide plate within the drum disposed below the inner discharge level of the chute to receive any débris that may be discharged from the chute through the apertures of the drum, and a collecting trough in the lower part of the drum with a guide extending beneath the collecting chute, terminating in a spout at the exterior of said drum, coacting as specified.

2. In a cherry pitting machine, the combination with the cherry supporting drum and plungers for forcing the pits from the cherries through the drum, a cylindrical pit chamber within the drum for collecting the pits with open longitudinal slot at the bottom and with a longitudinally-inclined discharge trough at the bottom of said chamber, a spiral brush within said chamber disposed to strike the pits from the plungers and discharge and collect the same in the trough, and a water supply opening into the inner end of said trough to carry the pits forward and discharge them, as specified.

3. In a cherry pitting machine the combination with the cherry supporting drum and plungers for forcing the pits from the cherries through the drum, a cylindrical pit chamber within the drum for collecting the pits with open longitudinal slot at the bottom and with a longitudinally-inclined discharge trough beneath said slot at the bottom of said chamber, and a corresponding cylindrical spiral brush within said chamber disposed to strike the pits from the plungers and discharge the same through said slot and collect the same in the trough, as specified.

4. In a cherry pitting machine the combination with the cherry supporting drum and plungers for forcing the pits from the cherries through the drum, a cylindrical pit chamber within the drum for collecting the pits with open longitudinal slot at the bottom, and a corresponding cylindrical spiral brush within said chamber disposed to strike the pits from the plungers and discharge the same through said slot, as specified.

In witness whereof I have hereunto set my hand.

HARVEY C. SCHAU.